United States Patent
Xi et al.

(10) Patent No.: US 9,329,448 B2
(45) Date of Patent: May 3, 2016

(54) ARRAY SUBSTRATE AND MANUFACTURING METHOD THEREOF, DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yusheng Xi, Beijing (CN); Jiarong Liu, Beijing (CN); Haichen Hu, Beijing (CN); Chunbing Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 202 days.

(21) Appl. No.: 14/055,083

(22) Filed: Oct. 16, 2013

(65) Prior Publication Data
US 2014/0104530 A1   Apr. 17, 2014

(30) Foreign Application Priority Data
Oct. 17, 2012   (CN) .......................... 2012 1 0395272

(51) Int. Cl.
| | | |
|---|---|---|
| *G02F 1/1343* | (2006.01) | |
| *G02F 1/136* | (2006.01) | |
| *G02F 1/1362* | (2006.01) | |
| *G02F 1/1368* | (2006.01) | |
| *G02F 1/1333* | (2006.01) | |

(52) U.S. Cl.
CPC ........ *G02F 1/136286* (2013.01); *G02F 1/1333* (2013.01); *G02F 1/1368* (2013.01); *G02F 2201/121* (2013.01); *G02F 2201/40* (2013.01)

(58) Field of Classification Search
CPC ............ G02F 1/136286; G02F 1/1368; G02F 1/1333; G02F 2201/121; G02F 2201/40
USPC ....................................... 349/42–43, 46, 147
See application file for complete search history.

(56) References Cited

U.S. PATENT DOCUMENTS

2011/0285931 A1\* 11/2011 Kimura ............. G02F 1/133555
349/46

\* cited by examiner

*Primary Examiner* — Charles Chang
(74) *Attorney, Agent, or Firm* — Ladas & Parry LLP

(57) ABSTRACT

Embodiments of the present invention provide an array substrate, a manufacturing method thereof and a display device. The array substrate comprises a plurality of pixel units, a plurality of gate lines and positive temperature coefficient (PTC) thermistors. The pixel units are arranged in a matrix and include a plurality of pixel rows and a plurality of pixel columns. Each pixel unit includes a common electrode and a thin-film transistor (TFT). The gate lines are arranged corresponding to each pixel row respectively and connected to the TFT of each pixel unit of a corresponding pixel row respectively. The PTC thermistors are configured to respectively connect the common electrode of each pixel unit to any one of gate lines arranged corresponding to any pixel row except the pixel row in which the pixel unit is disposed.

13 Claims, 6 Drawing Sheets

ARRAY SUBSTRATE AND MANUFACTURING METHOD THEREOF, DISPLAY DEVICE

CROSS REFERENCE TO RELATED APPLICATIONS

This application claims priority from Chinese National Application No. 201210395272.7 filed on Oct. 17, 2012, the contents of which are incorporated herein by reference.

BACKGROUND

Embodiments of the present invention relate to an array substrate, a manufacturing method thereof, and a display device.

Liquid crystal display (LCD) panels are developed towards large scale and high quality in the field of LCD with the constant update of technology currently. However, the large scale of the LCD panels tend to result in the increase of the wiring resistance of array substrates, and particularly tend to result in the display defects of green cast of display screens, flashes, afterimages and the like when the wiring resistance of common electrode lines is too large.

As illustrated in FIG. 1 which is a schematic structural view of a thin-film transistor (TFT) array substrate, common electrode lines 11 and gate lines 12 are arranged in parallel and prepared by the same process. As there are gate lines between the common electrode lines in a vertical direction (perpendicular to the extending direction of the gate lines 12), via holes are required to be formed in order to achieve the conduction of the common electrode lines 11 in the vertical direction and then form a matrix structure as shown in the figure. In addition, the common electrode lines 11 are connected to various common electrodes 161 in the vertical direction via the via holes and a transparent conductive (ITO) layer 14.

The structural design of the conventional array substrate has the following problems that: on one hand, due to the cumbersome wiring of the conventional common electrode lines, the pixel aperture ratio can be reduced and then the display effect can be influenced; and on the other hand, as the wiring resistance is large, the power consumption of the LCD panels, particularly large-size LCD panels, can be increased.

SUMMARY

An embodiment of the invention provides an array substrate, comprising: a plurality of pixel units arranged in a matrix and including a plurality of pixel rows and a plurality of pixel columns, each pixel unit including a common electrode and a thin-film transistor (TFT); a plurality of gate lines arranged corresponding to each pixel row respectively and connected to the TFT of each pixel unit in a corresponding pixel row respectively; and positive temperature coefficient (PTC) thermistors configured to respectively connect the common electrode of each pixel unit to any one of gate lines arranged corresponding to any pixel row except the pixel row in which the pixel unit is disposed.

In one example, the common electrode of each pixel unit is connected to a gate line arranged corresponding to a pixel row adjacent to the pixel row in which the pixel unit is disposed.

In one example, at least a part of each PTC thermistor is arranged to be overlapped with a corresponding common electrode; and the gate lines connected to the PTC thermistors are arranged on the PTC thermistors.

In one example, the PTC thermistors are arranged on the gate lines connected thereto; and at least a part of each common electrode is arranged to be overlapped with a corresponding PTC thermistor.

In one example, the PTC thermistors and the gate lines connected thereto have same patterns.

In one example, the PTC thermistors are made of organic polymer PTC conductive materials.

In one example, each pixel unit further includes a pixel electrode configured to form an electric field together with the common electrode; a gate electrode of the TFT of each pixel unit is connected to a corresponding gate line; and a drain electrode of the TFT is connected to the pixel electrode.

In one example, the common electrode of each pixel unit is connected to a gate line in an adjacent row next to the pixel row in which the pixel unit is disposed through the PTC thermistor; the array substrate further comprises a redundant gate line; and the common electrode of each pixel unit in the last pixel row is connected to the redundant gate line.

In one example, the common electrode of each pixel unit is connected to a gate line in an adjacent row previous to the pixel row in which the pixel unit is disposed through the PTC thermistor; the array substrate further comprises a redundant gate line; and the common electrode of the pixel unit in the first pixel row is connected to the redundant gate line.

In one example, a threshold voltage of the TFT is greater than a difference between a maximum voltage of a data line and a low voltage of the gate electrode.

Another embodiment of the invention provides a display device, comprising the array substrate according to any embodiment of the invention.

Still another embodiment of the invention provides a method for manufacturing an array substrate, comprising the following steps of: forming a plurality of common electrodes, a plurality of positive temperature coefficient (PTC) thermistors and a plurality of gate lines in this order or in a reverse order; and forming a gate insulating layer, a semiconductor layer, a data line layer, a surface protective layer and a pixel electrode layer in this order; wherein the plurality of common electrodes are arranged in a matrix and include a plurality of electrode rows and a plurality of electrode columns; the plurality of PTC thermistors are arranged corresponding to the plurality of common electrodes respectively; the plurality of gate lines are arranged corresponding to each electrode row respectively; and each common electrode is connected to a gate line corresponding to an electrode row adjacent to the electrode row in which the common electrode is disposed through a corresponding PTC thermistor.

In one example, the PTC thermistors and the gate lines have same patterns.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
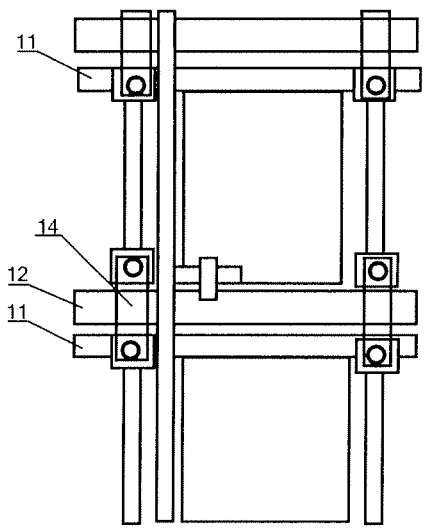
FIG. 1 is a schematic structural view of the conventional array substrate.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the present invention provide an array substrate, a manufacturing method thereof, a display device and a driving method thereof, which not only can increase the pixel aperture ratio and improve the display effect but also can greatly reduce the power consumption of panels.

Description will be given below by taking a thin-film transistor liquid crystal display (TFT-LCD) as an example. When the display device is driven by means of a line sequence scanning, a drive circuit outputs a high voltage (i.e. a turn-on voltage, which is also referred to as a high voltage in the following description in order to facilitate understanding) to a gate line in a first row and outputs a low voltage (i.e. a turn-off voltage) to other rows within the time of one frame, so as to control the TFTs in the first row to be turned on and load display data to the pixel units in the first row through the data lines; subsequently, the drive circuit turns off the first row, outputs the high voltage to a gate line in a second row and turns on the TFTs in the second row, and at this point, the low voltage is inputted into other rows including the first row which are then in the off state, and display data are loaded into the pixel units in the second row through the data lines; . . . the rows are turned on one by one and the display data are loaded until an image frame can be displayed. The process is short in time, and a complete image can be seen by human eyes due to the persistence of vision.

A gate line in a row outputs the high voltage only when the TFTs in the row are turned on so as to load display data to the pixel units, and is in the low-voltage state the rest of the time. Therefore, the design concept of the invention is that: when the gate lines output the turn-off voltage, the turn-off voltage is taken as a common voltage and inputted into the common electrodes in the pixel units, so that common electrode lines can be omitted and common voltage input signals are not required any more.

Detailed description will be given below to the embodiments of the present invention with reference to the accompanying drawings. The preferred embodiments described herein are only intended to illustrate the present invention and not intended to limit the present invention.

First Embodiment

An array substrate provided by the embodiment of the present invention comprises a plurality of pixel units, a plurality of gate lines and PTC thermistors. The pixel units are arranged in a matrix and include a plurality of pixel rows and a plurality of pixel columns; each pixel unit includes a common electrode and a thin-film transistor (TFT). The gate lines are arranged corresponding to each pixel row respectively and connected to the TFT of each pixel unit in a corresponding pixel row respectively. The PTC thermistors are configured to respectively connect the common electrode of each pixel unit to any one of the gate lines arranged corresponding to any pixel row except the pixel row in which the pixel unit is disposed.

The array substrate provided by the embodiment of the present invention will be further described below. For instance, the array substrate comprises a plurality of the pixel units connected to a first gate line. The array substrate further comprises PTC thermistors, wherein common electrodes of the pixel units are connected to a second gate line through the PTC thermistor; and the second gate line is a gate line which does not output the turn-on voltage at the same time with the first gate line.

In the embodiment, the first gate line generally refers to any gate line on the array substrate and is not for limitation; the pixel units refer to all the pixel units connected to and controlled by the first gate line; and the second gate line refers in particular to any gate line which does not output the turn-on voltage at the same time with the first gate line. That is to say, the first gate line and the second gate line are gate lines disposed in different pixel rows.

For instance, the PTC thermistors are formed between the gate lines and the common electrodes and server as a media for controlling the conduction or disconnection between the gate lines and the common electrodes.

The positive temperature coefficient thermistor (hereinafter referred to as PTC thermistor) in the embodiment of the present invention generally refers to a semiconductor material or component with large PTC and is a typical temperature-sensitive semiconductor resistor. The resistance of the PTC thermistor is significantly increased along with the temperature rise when the temperature exceeds a certain temperature (the Curie temperature). The PTC thermistor has good designability, and the temperature sensitivity of the PTC thermistor can be adjusted by changing the switching temperature (Ts) thereof, so that the PTC thermistor can control the conduction between the gate line and the common electrode in the case of low voltage and the disconnection between the gate line and the common electrode in the case of high voltage.

When the second gate line outputs the turn-off voltage (low voltage), as the temperature of the thermistor is close to the room temperature, the PTC thermistor has small resistance and will not prevent the current from running therethrough when connected in series to a circuit, and conduction between the second gate line and the common electrode of the pixel unit is established through the PTC thermistor. When the second gate line outputs the turn-on voltage (high voltage), the temperature of the PTC thermistor is raised due to the increase of the heating power; and when the temperature exceeds the switching temperature (the Curie temperature), the resistance of the PTC thermistor is increased instantaneously along with the temperature rise, so that the second gate line can be disconnected with the common electrode of the pixel unit.

In specific implementation, appropriate PTC thermistors are selected according to the turn-on voltage and the turn-off voltage outputted by the gate lines. The difference between the turn-on voltage and the turn-off voltage is generally about 20 volts, and the conventional PTC thermosensitive conductive material can satisfy the condition of conduction in the case of low voltage and disconnection in the case of high voltage. For instance, resettable fuse materials can be selected to prepare the PTC thermistors in the embodiment of the present invention.

The PTC thermistors are generally made of organic polymer PTC conductive materials and inorganic barium titanate ceramic conductive materials. For instance, the organic polymer PTC conductive materials which facilitate film forming may be adopted.

In the array substrate provided by the embodiment of the present invention, when the gate lines are in the low-voltage state, the resistance of the PTC thermistors between the gate lines and the common electrodes is small, and well conduction can be achieved; and when the gate lines are in the high-voltage state, the resistance of the PTC thermistors between the gate lines and the common electrodes is large, and thus the input of high-voltage signals of the gate lines into the common electrodes can be avoided and the turn-off voltage outputted by gate lines in the low-voltage state within the same frame time can be rationally utilized. Therefore, the array substrate provided by the embodiment does not need the wiring of common electrode lines and common voltage input signals, and thus not only the pixel aperture ratio can be increased and the display effect can be improved but also the power consumption of panels can be greatly reduced.

For instance, the second gate line is adjacent to the first gate line and is a gate line in the previous row or in the next row of the first gate line.

As for a display device adopting the means of line sequence scanning, at some point, only one gate line outputs the turn-on voltage and all the other gate lines output the turn-off voltage. However, in view of the preparation process, the common electrode of the pixel unit controlled by the first gate line is connected to a gate line adjacent to the first gate line, namely the second gate line, and more specifically, the adjacent gate line in the previous row or in the next row of the first gate line, through the PTC thermistor. In this way, the array substrate provided by the embodiment of the present invention can be manufactured only by slightly modifying the conventional manufacturing process, which will be further described in the second embodiment.

Figure 2:
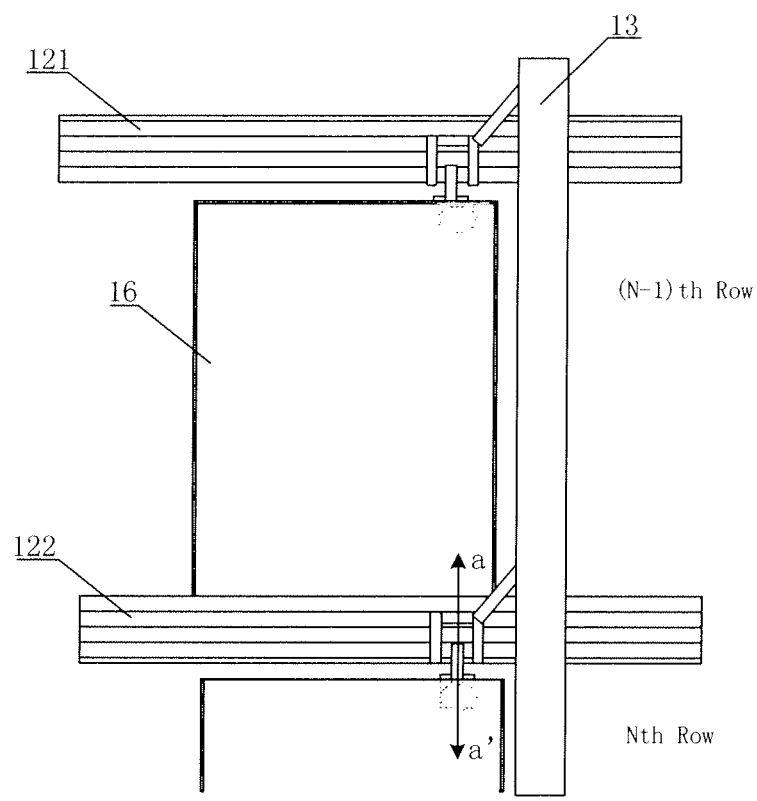
FIG. 2 is a schematic structural top view of an array substrate provided by a first embodiment of the present invention.
Figure 3:
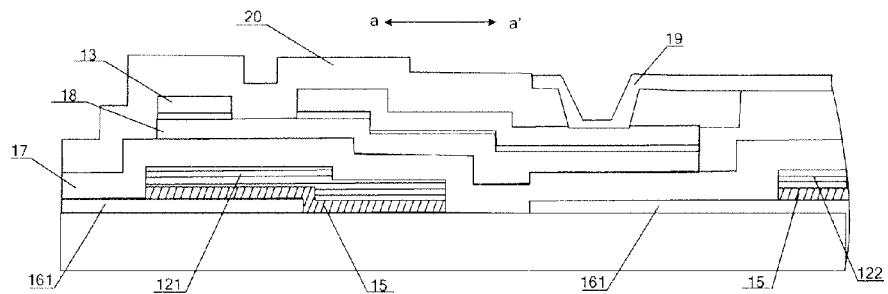
FIG. 3 is a schematic structural view of the array substrate provided by the first embodiment of the present invention along the a-a' direction.

FIGS. 2 and 3 illustrate a first specific structure of the array substrate provided by the embodiment. In the structure, at least a part of each PTC thermistor 15 is arranged to be overlapped with a common electrode 161; a second gate line 122 is arranged on the PTC thermistors 15; and the common electrode 161 is connected to the second gate line 122 through the PTC thermistor 15. In addition, the array substrate provided by the embodiment further comprises a gate insulating layer 17, a semiconductor layer 18, a data line layer 13, a pixel electrode layer 19 and a surface protective layer 20. For instance, in the embodiment, the gate insulating layer 17, the semiconductor layer 18, the data line layer 13, the pixel electrode layer 19 and the surface protective layer 20 are sequentially stacked on the substrate. However, the embodiment of the present invention is not limited to the stacking sequence and may adopt any suitable stacking sequence.

It should be noted that FIG. 3 illustrates a plane field mode array substrate which is only an illustrative specific implementation of the embodiment and not intended to limit the embodiment.

A first gate line 121 as shown in the figure generally refer to any gate line on the array substrate, and the second gate line 122 refers in particular to a gate line in the next row adjacent to the first gate line 121. In specific implementation, the first gate line is not provided with a PTC thermistor 15 and not connected to any common electrode 161, and a redundant gate line provided with a thermistor is required to be additionally arranged at the bottom; the common electrode 161 of each pixel unit 16 in each row is connected to the gate line in the next row through the PTC thermistor 15; and the common electrode 161 of each pixel unit 16 in the last row is connected to the redundant gate line through the PTC thermistor 15.

Of course, the second gate line 122 may also be a gate line in the previous row adjacent to the first gate line 121. At this point, a redundant gate line provided with a thermistor is required to be additionally arranged on the top; the common electrode 161 of each pixel unit 16 in each row is connected to the gate line in the previous row through the PTC thermistor 15; the common electrode 161 of each pixel unit 16 in the first row is connected to the redundant gate line through the PTC thermistor 15; and the gate line in the last row is not provided with a PTC thermistor 15.

Figure 4:
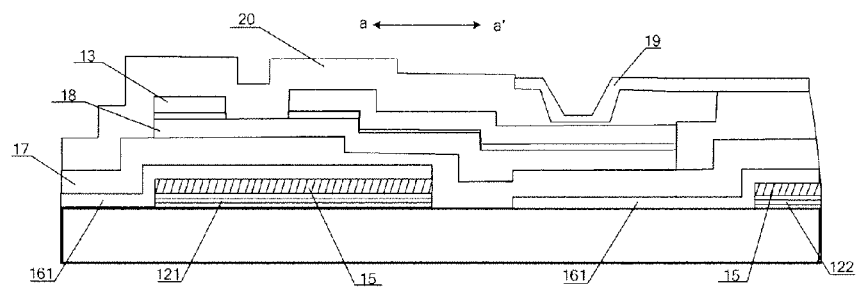
FIG. 4 is another schematic structural view of the array substrate provided by the first embodiment of the present invention along the a-a' direction.

For instance, the PTC thermistors and the gate lines have same patterns and can be prepared by one photolithography process, no additional preparation process is required. FIG. 4 illustrates a second specific structure of the array substrate provided by the embodiment. The differences between the second specific structure and the first specific structure as shown in FIG. 3 are as follows: the PTC thermistors 15 are arranged on the second gate lines 122; at least a part of each common electrodes 161 is arranged to be overlapped with the PTC thermistors 15; and similarly, the common electrodes 161 may also be connected to the second gate lines 122 through the PTC thermistors 15.

The array substrate provided by the embodiment does not need the wiring of the common electrode lines and the common voltage input signals, so that not only the pixel aperture ratio can be increased but also the power consumption of the panels can be greatly reduced. Moreover, as the PTC thermistors and the gate lines have same patterns and can be prepared by one photolithography process, no additional preparation process is required.

Description is given below by taking an advanced super dimension switch (AD-SDS, ADS for short) mode array substrate for example. The ADS technology can be divided into high-transmittance I-ADS technology, high aperture ratio H-ADS technology, high-resolution S-ADS technology and the like based on the improvement. An I-ADS mode array substrate and an S-ADS mode array substrate are as illustrated in the embodiment of the present invention. The difference between an H-ADS mode array substrate and the array substrate provided by the embodiment of the present invention is that the common electrodes of the array substrate provided by the present invention are arranged on a glass substrate but common electrodes of the H-ADS mode array substrate are arranged above pixel electrodes. Therefore, in the H-ADS mode array substrate, PTC thermistors are arranged on gate lines, and the common electrodes are connected to the PTC thermistors via through holes. Except for that, the specific structure and the manufacturing process of the array substrate are substantially the same.

But actually the application of the present invention is not limited thereto. The present invention is also applicable to an in-plane switching (IPS) mode array substrate.

As for the IPS mode array substrate, common electrodes and pixel electrodes are arranged on the same layer. Except for that, the specific structure and the manufacturing process of the array substrate are also substantially the same and will not be further described herein.

The embodiment of the present invention further provides a display device, which comprises any foregoing array substrate. The display device may be an LCD panel, an electronic paper, an organic light-emitting diode (OLED) panel, a mobile phone, a tablet computer, a television, a display, a notebook computer, a digital picture frame, a navigator or any other product or component with display function.

The display device provided by the embodiment of the present invention adopts an array substrate which does not need common voltage lines. Therefore, the display device not only has higher transmittance and lower power consumption but also can avoid the display defects of greenish display screens, flashes, afterimages and the like due to the too large wiring resistance of the common voltage lines, and improve the display effect.

Second Embodiment

The embodiment of the present invention further provides a method for manufacturing an array substrate, which, for instance, is applicable to a plane field mode array substrate. The method comprises the following steps of: forming a plurality of common electrodes, a plurality of PTC thermistors and a plurality of gate lines in this order or in a reverse order; and forming a gate insulating layer, a semiconductor layer, a data line layer, a surface protective layer and a pixel electrode layer in this order; wherein a plurality of the common electrodes are arranged in a matrix and include a plurality of electrode rows and a plurality of electrode columns; a plurality of the PTC thermistors are arranged corresponding to a plurality of the common electrodes respectively; a plurality of the gate lines are arranged corresponding to each electrode row respectively; and each common electrode is connected to a gate line in an pixel row adjacent to the electrode row in which the common electrode is disposed through a corresponding PTC thermistor.

Figure 5:
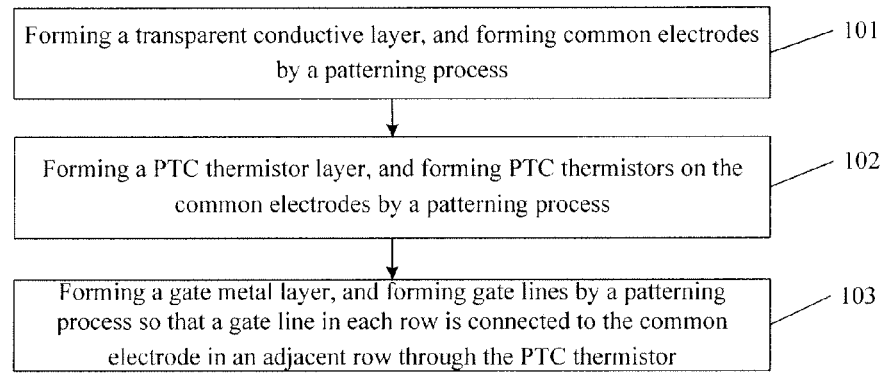
FIG. 5 is a flowchart of a method for manufacturing an array substrate provided by a second embodiment of the present invention.
Figure 6:
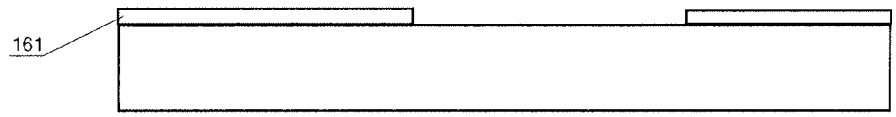
FIGS. 6(a) and 6(b) are respectively a schematic structural sectional view and a schematic top view of a common electrode in the second embodiment of the present invention.
Figure 6:
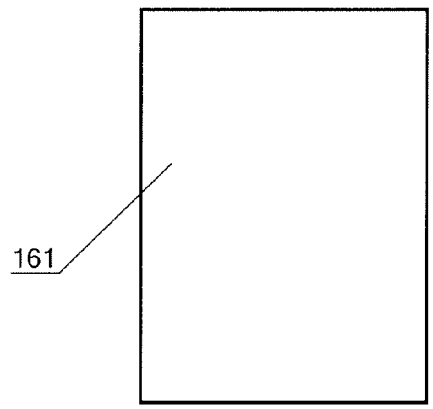

FIG. 5 is a flowchart of an example of the manufacturing method. The method comprises the following steps of:

Step 101: depositing a transparent conductive layer on a glass substrate and forming common electrodes 161 by a patterning process. The sectional plan view and the top plan view of the common electrode are as illustrated in FIGS. 6(a) and 6(b) respectively.

Figure 7A:
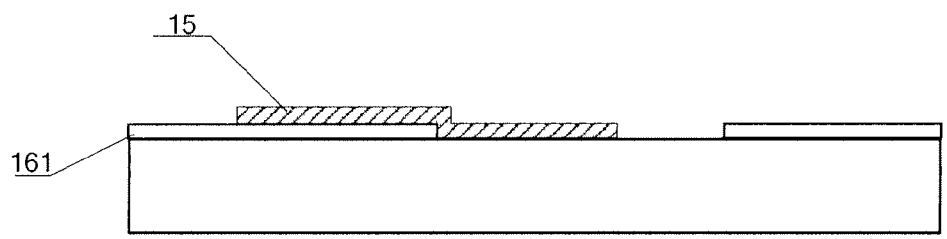
FIGS. 7(a) and 7(b) are respectively a schematic structural sectional view and a schematic top view of a positive temperature coefficient (PTC) thermistor in the second embodiment of the present invention.
Figure 7B:
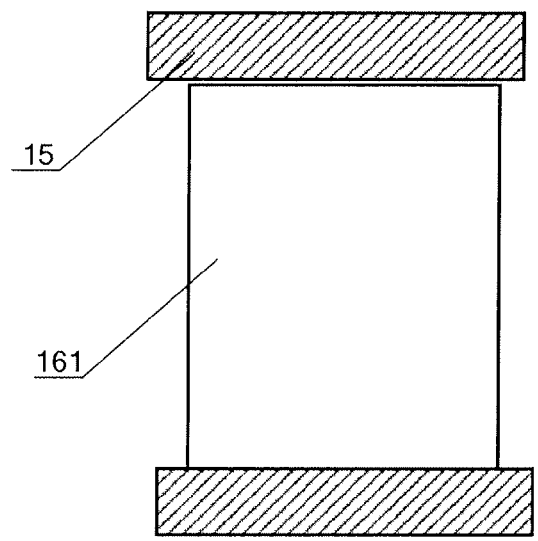

Step 102: depositing a PTC thermistor layer, forming PTC thermistors 15 on the common electrodes 161 by a patterning process so that at least a part of each PTC thermistor 15 is arranged to be overlapped with a corresponding common electrode 161. The patterns are as illustrated in FIGS. 7(a) and 7(b).

Figure 8:
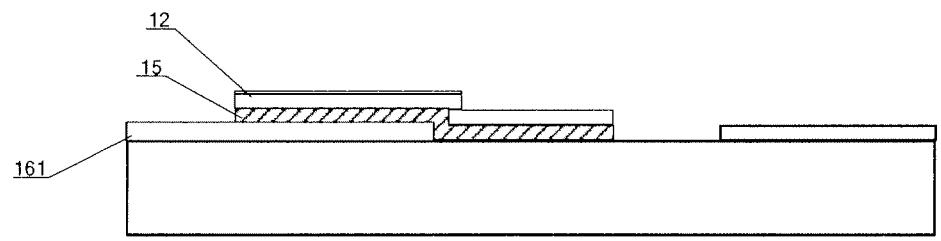
FIGS. 8(a) and 8(b) are respectively a schematic structural sectional view and a schematic top view of gate lines in the second embodiment of the present invention.
Figure 8:
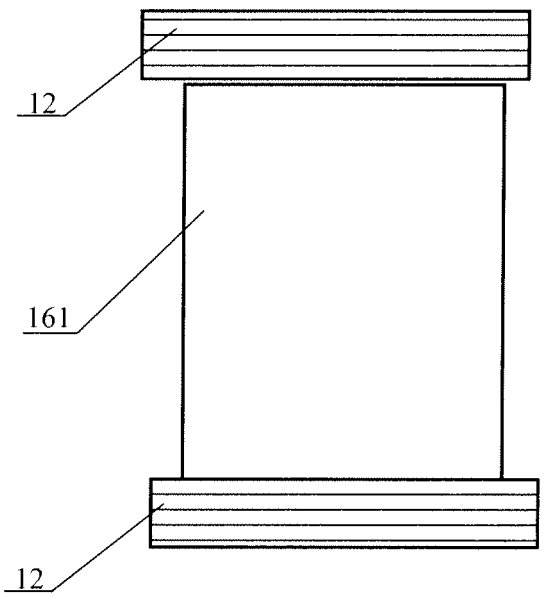

Step 103: depositing a gate metal layer, forming gate lines 12 by a patterning process so that a gate line 12 in each row is connected to the common electrode 161 in an adjacent row through the PTC thermistor 15. The patterns are as illustrated in FIGS. 8(a) and 8(b).

In the prior art, gate lines are directly arranged on a substrate between any two common electrodes. But in the embodiment, firstly, a PTC thermistor 15 is formed on the edge of any common electrode 161 so that at least a part of each PTC thermistor 15 is arranged to be overlapped with a corresponding common electrode 161; and secondly, a gate line 12 is formed on the PTC thermistor 15 and deviated towards a gate line in the next row (or the previous row). As illustrated in FIG. 7, the gate line 12 is arranged on the edge of the common electrode 161 through the PTC thermistor 15, and finally the common electrode 161 in each pixel unit 16 controlled by the gate line 12 is connected to another gate line 12 in the next row (or the previous row) of the gate line.

For instance, the PTC thermistors 15 and the gate lines 12 have same patterns and can be prepared by one photolithography process. Therefore, no additional preparation process is required.

Figure 9:
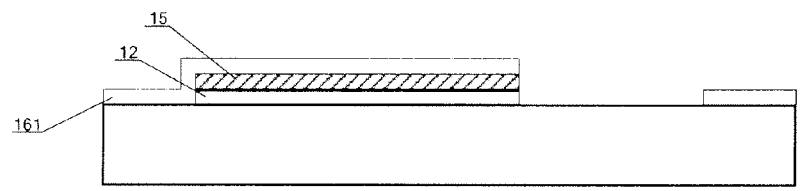
FIG. 9 is a schematic diagram of another method for manufacturing an array substrate in the second embodiment of the present invention.

Alternatively, as illustrated in FIG. 9, the above process may also be that: firstly, the gate lines 12 are formed; secondly, the PTC thermistors 15 are prepared; and finally, the common electrodes 161 are formed. The specific process is as follows:

Step 201: depositing a gate metal layer and forming gate lines 12 by a patterning process;

Step 202: depositing a PTC thermistor layer and forming PTC thermistors on the gate lines 12 by a patterning process; and Step 203: depositing a transparent conductive layer, forming common electrodes 161 at predetermined positions by a patterning process so that at least a part of each common electrode 161 in each row is arranged to be overlapped with the PTC thermistor 15 and the common electrode 161 is connected to the gate line 12 in the adjacent row through the PTC thermistor 15.

For instance, the PTC thermistors 15 and the gate lines 12 have same patterns and can be prepared by one photolithography process. Therefore, no additional preparation process is required.

Subsequently, a gate insulating layer 17, a semiconductor layer 18, a data line layer 13, a pixel electrode layer 19 and a surface protective layer 20 are formed according to the flowchart of the plane field mode array substrate, and then the array substrate can be manufactured.

In the method for manufacturing the array substrate, provided by the embodiment of the present invention, the PTC thermistors are deposited between the gate lines and the common electrodes and serve as a media for controlling the conduction or disconnection between the gate lines and the common electrodes. When the gate lines are in the low-voltage state, the resistance of the PTC thermistors between the gate lines and the common electrodes is small, and good conduction can be achieved. When the gate lines are in the high-voltage state, the resistance of the PTC thermistors between the gate lines and the common electrodes is large, and thus the input of high-voltage signals of the gate lines into the common electrodes can be avoided and the turn-off voltage outputted by gate lines in the low voltage state within the same frame time can be rationally utilized. Therefore, the array substrate provided by the embodiment does not need the wiring of common electrode lines and common voltage input signals, and thus not only the pixel aperture ratio can be increased and the display effect can be improved but also the power consumption of panels can be greatly reduced. Moreover, no additional process is required.

Third Embodiment

Figure 10:
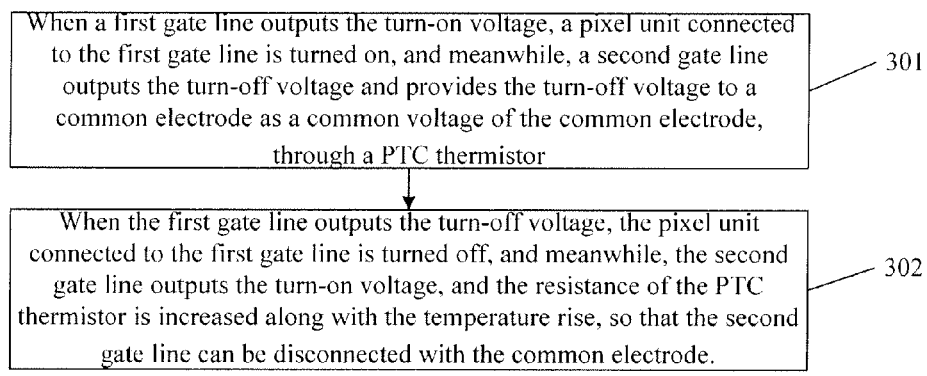
FIG. 10 is a schematic diagram of a method for driving an array substrate in a third embodiment of the present invention.

The embodiment of the present invention provides a method for driving an array substrate, which is applicable to any array substrate provided by the first embodiment. As illustrated in FIG. 10, the driving method comprises the following steps that:

Step 301: when a first gate line outputs the turn-on voltage, a pixel unit connected to the first gate line is turned on, and meanwhile, a second gate line outputs the turn-off voltage and provides the turn-off voltage to a common electrode as a common voltage of the common electrode, through a PTC thermistor; and Step 302: when the first gate line outputs the turn-off voltage, the pixel unit connected to the first gate line is turned off, and meanwhile, the second gate line outputs the turn-on voltage, and the resistance of the PTC thermistor is increased along with the temperature rise, so that the second gate line can be disconnected with the common electrode.

Specifically, by taking an array substrate, which adopts the means of line sequence scanning and in which the second gate line is a gate line in the next row of the first gate line, as an example, the method for driving the array substrate is described as follows:

When the first gate line outputs the turn-on voltage to control a pixel unit in a first row to be turned on, a gate line in a second row is in the off state and connected to a common electrode in the first row through a PTC thermistor. As the resistance of the PTC thermistor is small in the case of low voltage, the gate line in the second row is electrically communicated with the common electrode in the first row. At this point, the low voltage (the turn-off voltage) of the gate line in the second row provides a common voltage for the common electrode in the first row, and a data line loads display data for the pixel unit in the first row. When the gate line in the second row is turned on, as the resistance of the PTC thermistor is large in the case of high voltage, the gate line in the high-voltage state is disconnected with the common electrode, and thus the normal display of the previous row cannot be affected; meanwhile, the low voltage (the turn-off voltage) of a gate line in a third row provides a common voltage for a common electrode in the second row, and a data line loads display data for a pixel unit in the second row; ... the process is continued until the last row is scanned, and then a scanning picture of one frame can be finished.

It should be noted that the data line voltage representing the display data on the data line is relative to the common electrode. As the turn-off voltage outputted by the gate line is taken as the common voltage in the embodiment of the present invention, the data line voltage must also be adjusted comparing with the prior art. Supposing that the turn-off voltage outputted by the gate line is −8V, the common electrode voltage is 8V, and the data line voltage is 0-16V, the common voltage in the driving method provided by the present invention is converted into −8V correspondingly and the data line voltage must be adjusted to be 0V to −16V correspondingly.

Moreover, as for the Nth row in FIG. 2, when the row is completely scanned and in the off state, the gate line is in the low-voltage state is electrically communicated with the common electrode through the PTC thermistor and provides voltage for the common electrode. But as for a TFT, according to the above assumption, as the data line voltage at this point is between 0V and −16V, the voltage of a source electrode of the TFT is between 0V and −16V, and the voltage of a gate electrode of the TFT is −8V, and the voltage difference between the gate electrode and the source/drain electrode is between +8V and −8V. But the threshold voltage Vth of the TFT used in the prior art is between 0V and 3V, and thus the TFT at this point may be in the on state and then the normal display may be affected. Therefore, when the supposed voltages are adopted, the normal display can only be guaranteed by selecting the TFT of which the threshold voltage Vth is more than 8V in the embodiment of the present invention. In summary, the threshold voltage Vth of the TFT in the embodiment of the present invention must be more than the difference between the maximum voltage of the data line voltage and the low voltage of the gate electrode, and the threshold voltage can be adjusted according to the preparation process and the material of the TFT.

The method for driving the array substrate, provided by the embodiment of the present invention reasonably utilizes the turn-off voltage output by gate lines in the low voltage state within the same frame time as the common voltage and does not need the common voltage input signals and the wiring of the common electrode lines. Therefore, not only the pixel aperture ratio can be increased and the display effect can be improved but also the power consumption of the panels can be greatly reduced.

Although the embodiment of the present invention takes an LCD screen as an example, actually the application of the present invention is not limited thereto. The present invention may also be applicable to a light-emitting diode (LED) display screen. At this point, the gate line should be construed as a line configured to control the On/Off state of the pixel unit, and the common electrode should be construed as the other end of an LED lamp without the input of the display data, which is generally a low-voltage end or a ground end.

The technical characteristics described in the embodiments of the present invention can be used by being combined with each other in the non-conflict condition.

The foregoing are merely exemplary embodiments of the invention, but are not used to limit the protection scope of the invention. The protection scope of the invention shall be defined by the attached claims.

What is claimed is:

1. An array substrate, comprising:
a plurality of pixel units arranged in a matrix and including a plurality of pixel rows and a plurality of pixel columns, each pixel unit including a common electrode and a thin-film transistor (TFT); a plurality of gate lines arranged corresponding to each pixel row respectively and connected to the TFT of each pixel unit in a corresponding pixel row respectively; and
positive temperature coefficient (PTC) thermistors configured to respectively connect the common electrode of each pixel unit to any one of gate lines arranged corresponding to any pixel row except the pixel row in which the pixel unit is disposed.

2. The array substrate according to claim 1, wherein the common electrode of each pixel unit is connected to a gate line arranged corresponding to a pixel row adjacent to the pixel row in which the pixel unit is disposed.

3. The array substrate according to claim 2, wherein at least a part of each PTC thermistor is arranged to be overlapped with a corresponding common electrode; and the gate lines connected to the PTC thermistors are arranged on the PTC thermistors.

4. The array substrate according to claim 2, wherein the PTC thermistors are arranged on the gate lines connected thereto; and at least a part of each common electrode is arranged to be overlapped with a corresponding PTC thermistor.

5. The array substrate according to claim 1, wherein the PTC thermistors and the gate lines connected thereto have same patterns.

6. The array substrate according to claim 1, wherein the PTC thermistors are made of organic polymer PTC conductive materials.

7. The array substrate according to claim 1, wherein each pixel unit further includes a pixel electrode configured to form an electric field together with the common electrode; a gate electrode of the TFT of each pixel unit is connected to a corresponding gate line; and a drain electrode of the TFT is connected to the pixel electrode.

8. The array substrate according to claim 2, wherein the common electrode of each pixel unit is connected to a gate line in an adjacent row next to the pixel row in which the pixel unit is disposed through the PTC thermistor; the array substrate further comprises a redundant gate line; and the common electrode of each pixel unit in the last pixel row is connected to the redundant gate line.

9. The array substrate according to claim 2, wherein the common electrode of each pixel unit is connected to a gate line in an adjacent row previous to the pixel row in which the pixel unit is disposed through the PTC thermistor; the array substrate further comprises a redundant gate line; and the common electrode of the pixel unit in the first pixel row is connected to the redundant gate line.

10. The array substrate according to claim 1, wherein a threshold voltage of the TFT is greater than a difference between a maximum voltage of a data line and a low voltage of the gate electrode.

11. A display device, comprising the array substrate according to claim 1.

12. A method for manufacturing an array substrate, comprising the following steps of: forming a plurality of common electrodes, a plurality of positive temperature coefficient (PTC) thermistors and a plurality of gate lines in this order or in a reverse order; and forming a gate insulating layer, a semiconductor layer, a data line layer, a surface protective layer and a pixel electrode layer in this order; wherein the plurality of common electrodes are arranged in a matrix and include a plurality of electrode rows and a plurality of electrode columns; the plurality of PTC thermistors are arranged corresponding to the plurality of common electrodes respectively; the plurality of gate lines are arranged corresponding to each electrode row respectively; and each common electrode is connected to a gate line corresponding to an electrode row adjacent to the electrode row in which the common electrode is disposed through a corresponding PTC thermistor.

13. The manufacturing method according to claim 12, wherein the PTC thermistors and the gate lines have same patterns.

* * * * *